Nov. 8, 1932.  T. J. GEISLER  1,887,152
FRUIT JAR OPENER AND HOLDER
Filed June 16, 1932
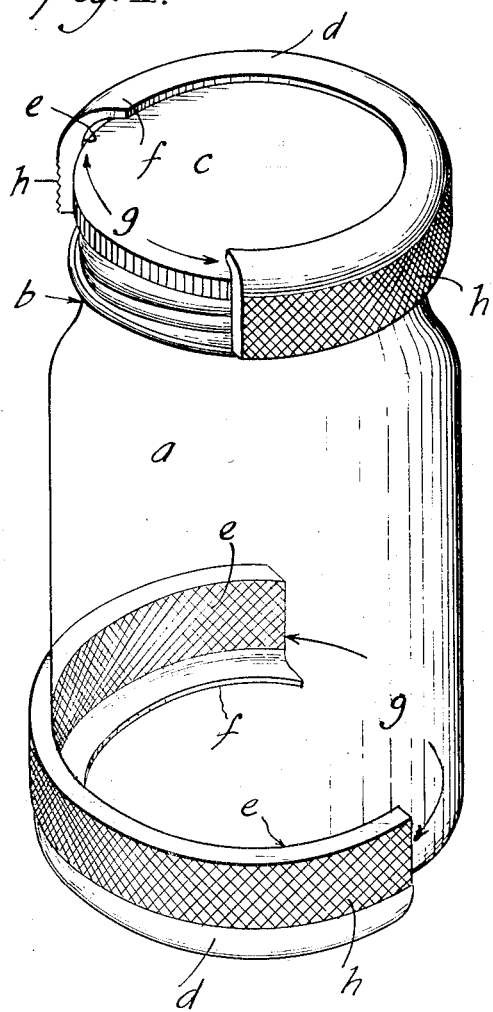
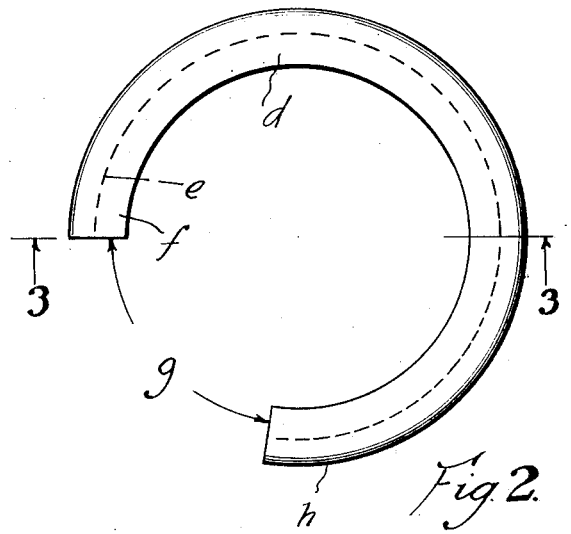
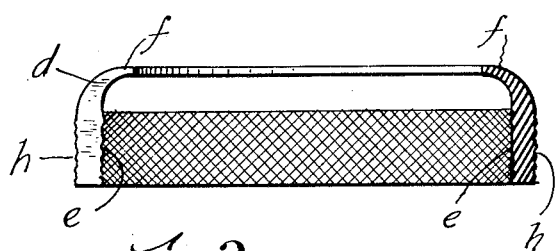
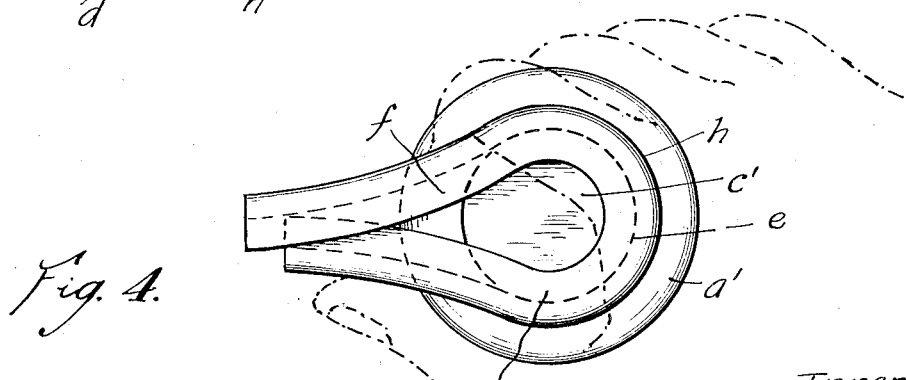
Inventor:
Theodore J. Geisler
by D. D. Huntress
Atty Patented Nov. 8, 1932

1,887,152

UNITED STATES PATENT OFFICE

THEODORE J. GEISLER, OF PORTLAND, OREGON

FRUIT JAR OPENER AND HOLDER

Application filed June 16, 1932. Serial No. 617,504.

The primary object of my invention is to provide a simple readily used device for unscrewing, and thus removing the screw cap, or cover, of a fruit jar or the like.

The jar openers heretofore marketed were made of rubber in the form of a closed ring, and in consequence if the jar cover was of larger size than conveniently accommodated by the interior diameter of the jar opener, difficulty was experienced in getting the jar opener over the jar cover. It required stretching and forcing of the jar opener onto the cover to engage it, and thus imposed inconvenience and hard work, especially since the handling of fruit jars is mostly done by women.

The only way to avoid such work with a closed ring-like jar opener is to make it oversized; but in such case it required considerable pressure of the hand to bring the jar opener into working engagement with the jar cover. Such pressure furthermore is resisted by the resiliency of a closed ring-like jar opener; and in consequence the pressure of the hand had to be sufficient to overcome such resistance and enough more to compress the sides or flanges of the jar opener upon the sides of the jar cover with sufficient force to secure a firm hold on the jar cover for unscrewing it. This imposed considerable work, as evident.

On the other hand, I have discovered that a much simpler jar opener could be made in the form of an open or split ring of resilient material, preferably rubber composition. In that form it can be made of one size, and readily slipped over any sized jar cover; and only sufficient pressure of the hand is required to obtain a firm grip with the jar opener on the rim of the jar cover. This is a very simple operation, and besides, as mentioned, enables the use of a single jar opener on jar covers of any size.

My improved jar opener further enables its use as a stand, or gripping medium for the bottom of the jar. This is great convenience since it is necessary to get a firm hold of the body of the jar while applying or removing its cover.

A further advantage of my jar opener is that it saves a considerable amount of material, which in the making of the jar opener in large quantities, effects a considerable saving.

A still further advantage of my jar opener is it may be made of less expensive rubber composition, since not being subjected to stretch in placing on a jar cover, it need not possess that high degree of resiliency as it would have to possess if subjected to such stretch. For a jar opener consisting of a closed ring is subjected to more or less stretch in each instant of its use.

The construction and use of my jar opener is illustrated in the accompanying drawing, in which:

Fig. 1 shows a fruit jar in perspective elevation with one of my improved cover removers applied to the cover, and another applied to the bottom of the jar to afford a firm grip of the latter;

Fig. 2 shows a top view of my jar cover remover;

Fig. 3 shows a section thereof on the line 3—3 of Fig. 2; and

Fig. 4 illustrates the use of my improved opener for removing the cover of a relatively small-sized jar, the hand of the operator being shown in dotted outline.

The jar $a$ is of the present conventional type. It has a threaded neck $b$ adapted to receive a threaded cover $c$. On the cover of the jar, shown in Fig. 1, has been placed my jar cover opener $d$, and another opener has been placed on the bottom of the jar; but in reversed position, since it is assumed the jar opener $d$ will be operated by the right hand, while the bottom of the jar will be seized by the left hand. My jar opener is made of resilient material preferably rubber composition. It consists of a split annular body, in other words, an annular body having the split or opening being indicated by the line $g$; the split may be produced by omitting a substantial portion. The annular wall of the body is formed with a perpendicular interior guide flange $f$ to facilitate the placing of the jar opener properly, either on the jar cover, or on the bottom of the jar.

The inner wall surface of the jar opener, indicated in Fig. 2 by the dotted line e, may be finished with roughened surface; and likewise the exterior wall surface h may be given a rough finish, so as to facilitate both the grip of the hand on the jar-opener, and the grip of the latter on the cover or bottom of the jar.

The providing of special friction surfaces on the interior or exterior, or both, of the flange of the body of my jar opener is optional. I believe that the rubber composition may be such as in itself to provide an efficient friction surface, sufficient to obtain an effective hold by the jar opener on the cover or body of the jar. A strip of fabric may also be used as a liner for the interior surface of the flange of my jar opener in order to provide the desired friction surface.

The size of the opening in the side of my jar opener is a matter of choice. The splitting of the jar opener so that it may be readily slipped over the jar top or cover, is in itself sufficient to facilitate its use.

If the ring be merely split, then the jar opener is best placed over the jar cover and pressed down upon it; but since the grip of the hand does not extend all around the jar opener, but encompasses only a portion of it, those portions of the ends of the jar opener which are not seized by the hand may well be omitted, and thus save on the amount of material used in manufacture, and correspondingly reduce the cost. By making the jar opener with a wide opening as shown in the drawings, it is conveniently slipped over the jar cover or the bottom of the jar, astride, as illustrated by Fig. 1.

In opening a smaller sized jar, my jar opener is applied and used as illustrated in Fig. 4; a' representing the jar, c' its cover and d my jar opener, which is of the same construction as above described.

Since the ring-form of my jar opener is split, there is no appreciable resistance to bending its free ends together; but on the other hand, if such free ends were connected by an integral piece, the resiliency of such integral connection would offer considerable resistance to the compression of the jar opener in its use upon a smaller sized jar cover.

With my jar opener the hand of the operator has to exercise but little more force than sufficient to bring the wall of the jar opener in firm engagement with the rim of the jar cover.

I have illustrated and described an efficient form of construction for carrying my invention into effect, but do not wish to be limited to the precise details of construction set forth, since these may be varied; and mere modifications of the elements of the following claims within the scope of my invention are intended to be included.

I claim:

1. A jar opener comprising a split annular, relatively broad body made entirely of resilient material such as rubber, or rubber substitute, normally preserving its annular form, but distortable by direct hand pressure; the body provided with an interior flange-like means for governing and aiding the proper placing of the opener on a jar-cover, said means adapted not to interfere with or prevent expanding the annular body to a larger form, or substantial distortion thereof, by hand pressure, to a smaller, or from a circular to a more elongated form.

2. A jar opener comprising a split annular, relatively broad body made entirely of resilient material such as rubber, or rubber substitute, normally preserving its annular form, but distortable by direct hand pressure; the body provided with an interior flange which is narrow in part, at least, for governing and aiding the proper placing of the opener on a jar-cover, the flange being adapted incidentally to serve to protect the hand from contact with the cover, but not to interfere with or prevent the expanding of the annular body to a larger form, or substantial distortion thereof, by hand pressure, to a smaller, or from a circular to a more elongated form.

THEODORE J. GEISLER.